United States Patent
Benjamin et al.

(10) Patent No.: US 10,184,665 B2
(45) Date of Patent: Jan. 22, 2019

(54) PREFILMING AIR BLAST (PAB) PILOT HAVING ANNULAR SPLITTER SURROUNDING A PILOT FUEL INJECTOR

(71) Applicant: General Electric Company, Schenectady, NY (US)

(72) Inventors: Michael Anthony Benjamin, Cincinnati, OH (US); Alfred Albert Mancini, Cincinnati, OH (US); Rameshkumar Muthuvel Chandrasekaran, Bangalore (IN)

(73) Assignee: General Electric Company, Schenectady, NY (US)

( * ) Notice: Subject to any disclaimer, the term of this patent is extended or adjusted under 35 U.S.C. 154(b) by 129 days.

(21) Appl. No.: 14/735,732

(22) Filed: Jun. 10, 2015

(65) Prior Publication Data
US 2016/0363320 A1    Dec. 15, 2016

(51) Int. Cl.
*F23R 3/28* (2006.01)
*F23D 11/10* (2006.01)
*F02C 7/22* (2006.01)

(52) U.S. Cl.
CPC ............... *F23R 3/286* (2013.01); *F02C 7/22* (2013.01); *F23D 11/107* (2013.01); *F23D 2900/11101* (2013.01)

(58) Field of Classification Search
CPC .... F02C 7/22; F23R 3/286; F23R 3/28; F23R 3/30; F23R 3/32; F23R 3/343; F23R 3/14
See application file for complete search history.

(56) References Cited

U.S. PATENT DOCUMENTS

| | | | |
|---|---|---|---|
| 3,980,233 | A | 9/1976 | Simmons et al. |
| 4,941,617 | A | 7/1990 | Russell |

(Continued)

FOREIGN PATENT DOCUMENTS

| | | |
|---|---|---|
| CA | 2597846 A1 | 2/2009 |
| CN | 103196156 A | 7/2013 |

(Continued)

OTHER PUBLICATIONS

European Search Report and Opinion issued in connection with corresponding EP Application No. 16172482.8 dated Oct. 12, 2016.

(Continued)

*Primary Examiner* — Craig Kim
*Assistant Examiner* — Edwin Kang
(74) *Attorney, Agent, or Firm* — General Electric Company; Pamela Kachur

(57) ABSTRACT

A fuel nozzle is provided for a gas turbine engine, and can include a pilot fuel injector having an axially-elongated, inner pilot centerbody wall and an outer pilot centerbody wall, with the axially-elongated, inner pilot centerbody wall extending from an upstream end to an annular fuel passage defining the downstream end of the pilot fuel injector. The fuel passage intersects with the inner pilot centerbody wall at a pilot fuel metering orifice. The fuel nozzle also includes a pilot fuel film surface downstream from the annular fuel passage and an annular splitter surrounding the pilot fuel injector. The annular splitter comprises, in axial sequence: an upstream section, a splitter throat having a diameter that is larger than a downstream diameter defined by the pilot fuel film surface, and a downstream diverging surface having an average diverging angle of about 24° to about 40° in relation to a centerline axis.

20 Claims, 3 Drawing Sheets

(56) References Cited

U.S. PATENT DOCUMENTS

| | | | |
|---|---|---|---|
| 5,044,559 | A | 9/1991 | Russell et al. |
| 6,367,262 | B1 | 4/2002 | Mongia et al. |
| 6,662,565 | B2 | 12/2003 | Brundish et al. |
| 7,669,420 | B2 | 3/2010 | Spooner |
| 8,057,220 | B2 | 11/2011 | Bretz |
| 9,429,324 | B2 * | 8/2016 | Matsuyama ............. F23R 3/14 |
| 9,927,126 | B2 | 3/2018 | Benjamin et al. |
| 2002/0011064 | A1 | 1/2002 | Crocker et al. |
| 2003/0141383 | A1 | 7/2003 | Hayashi |
| 2005/0039456 | A1 | 2/2005 | Hayashi |
| 2005/0229600 | A1 | 10/2005 | Kastrup et al. |
| 2006/0059914 | A1 | 3/2006 | Mantchenkov et al. |
| 2007/0137207 | A1 * | 6/2007 | Mancini .................... F23R 3/14 60/737 |
| 2009/0107147 | A1 | 4/2009 | Piper et al. |
| 2009/0173076 | A1 | 7/2009 | Toon |
| 2009/0234555 | A1 | 9/2009 | Williams et al. |
| 2009/0255258 | A1 | 10/2009 | Bretz et al. |
| 2009/0255262 | A1 * | 10/2009 | McMasters ............... F23R 3/14 60/742 |
| 2009/0277176 | A1 | 11/2009 | Caples |
| 2010/0050644 | A1 * | 3/2010 | Pidcock ............... F23D 11/107 60/737 |
| 2010/0050647 | A1 | 3/2010 | Goodwin |
| 2010/0083663 | A1 | 4/2010 | Fernandes et al. |
| 2010/0115955 | A1 | 5/2010 | Goeke et al. |
| 2010/0115956 | A1 | 5/2010 | Toon |
| 2010/0287946 | A1 | 11/2010 | Buelow et al. |
| 2010/0300105 | A1 | 12/2010 | Pelletier et al. |
| 2010/0308135 | A1 | 12/2010 | Yamamoto et al. |
| 2011/0031333 | A1 | 2/2011 | Short |
| 2011/0067403 | A1 | 3/2011 | Williams et al. |
| 2011/0072824 | A1 * | 3/2011 | Zuo ......................... F23D 14/62 60/746 |
| 2011/0089262 | A1 | 4/2011 | Thomson et al. |
| 2011/0089264 | A1 | 4/2011 | Thomson et al. |
| 2011/0143043 | A1 | 6/2011 | Zajchowski et al. |
| 2012/0047903 | A1 | 3/2012 | Williams et al. |
| 2012/0069698 | A1 | 3/2012 | Pack et al. |
| 2012/0117972 | A1 | 5/2012 | Goeke et al. |
| 2012/0186259 | A1 | 7/2012 | Hoke |
| 2012/0227410 | A1 | 9/2012 | Williams et al. |
| 2012/0234013 | A1 | 9/2012 | Overman et al. |
| 2012/0247119 | A1 | 10/2012 | Williams et al. |
| 2012/0260663 | A1 | 10/2012 | Pidcock |
| 2012/0292408 | A1 | 11/2012 | Short |
| 2012/0304649 | A1 * | 12/2012 | Matsuyama ............. F23R 3/14 60/737 |
| 2012/0324895 | A1 | 12/2012 | Ogata et al. |
| 2013/0032639 | A1 | 2/2013 | Harding |
| 2013/0055719 | A1 | 3/2013 | Ogata et al. |
| 2013/0067919 | A1 | 3/2013 | Ogata |
| 2013/0167541 | A1 * | 7/2013 | Bathina .................... F23R 3/14 60/738 |
| 2013/0167544 | A1 | 7/2013 | Nickolaus |
| 2013/0306181 | A1 | 11/2013 | Mitchell et al. |
| 2014/0041390 | A1 | 2/2014 | Williams et al. |
| 2014/0083105 | A1 | 3/2014 | Kobayashi et al. |
| 2014/0102572 | A1 | 4/2014 | Ryon |
| 2014/0109581 | A1 | 4/2014 | Dudebout et al. |

FOREIGN PATENT DOCUMENTS

| | | |
|---|---|---|
| EP | 1712842 A2 | 10/2006 |
| EP | 1750056 A2 | 2/2007 |
| EP | 2085145 A1 | 8/2009 |
| EP | 2336381 A1 | 6/2011 |
| EP | 2481985 A2 | 8/2012 |
| EP | 2500641 A1 | 9/2012 |
| EP | 2511498 A2 | 10/2012 |
| EP | 2525152 A2 | 11/2012 |
| EP | 2532859 A1 | 12/2012 |
| EP | 2554823 A1 | 2/2013 |
| EP | 2554909 A2 | 2/2013 |
| EP | 2562394 A1 | 2/2013 |
| EP | 2589867 A2 | 5/2013 |
| EP | 2592351 A1 | 5/2013 |
| EP | 2722593 A2 | 4/2014 |
| EP | 2743581 A1 | 6/2014 |
| EP | 2743588 A1 | 6/2014 |
| GB | 1491383 A | 11/1977 |
| JP | 5164116 A | 6/1976 |
| JP | 6317958 U | 2/1988 |
| JP | 2003214604 A | 7/2003 |
| JP | 2004360944 A | 12/2004 |
| JP | 2005055091 A | 3/2005 |
| JP | 2006090327 A | 4/2006 |
| JP | 2011208938 A | 10/2011 |
| WO | 2012165614 A1 | 12/2012 |
| WO | WO 2013/102136 A2 | 7/2013 |
| WO | WO 2013/173162 A2 | 11/2013 |
| WO | WO 2014/090493 A1 | 6/2014 |
| WO | WO 2014/090495 A1 | 6/2014 |

OTHER PUBLICATIONS

GE Related Case Form.

Lefebvre, "Gas Turbine Combustion", pp. 244-245, Dec. 31, 2009. Retrieved form the internet: URL: http://www.crcpress.com/Gas-Turbine-Combustion-Alternative-Fuels-and-Emissions-Third-Eddition/Lefebvre-Ballal/p/book/9781420086041.

European Search Report and Opinion issued in connection with related EP Application No. 16173950.3 dated Nov. 10, 2016.

Chaussonnet et al., "Large Eddy Simulation of a Prefilming Airblast Atomizer", 25th European Conference on Liquid Atomization and Spray Systems, China, Greece, pp. 1-7, Sep. 1-4, 2013.

U.S. Non-Final Office Action issued in connection with related U.S. Appl. No. 14/735,694, dated Apr. 5, 2017.

Japanese Office Action issued in connection with corresponding JP Application No. 2016111393 dated May 23, 2017.

Japanese Search Report issued in connection with related JP Application No. 2016111392 dated May 25, 2017.

Japanese Office Action issued in connection with related JP Application No. 2016111392 dated Jun. 6, 2017.

U.S. Final Office Action issued in connection with related U.S. Appl. No. 14/735,694 dated Jul. 31, 2017.

Japanese Search Report issued in connection with corresponding JP Application No. 2016111393 dated Aug. 3, 2017.

First Office Action and Search issued in connection with corresponding CN Application No. 201610400524.9 dated Apr. 3, 2018.

\* cited by examiner

PREFILMING AIR BLAST (PAB) PILOT HAVING ANNULAR SPLITTER SURROUNDING A PILOT FUEL INJECTOR

FIELD OF THE INVENTION

The present subject matter relates generally to gas turbine engine fuel nozzles. More particularly, the present subject matter relates to a fuel nozzle for gas turbine engine with TAPS (twin annular pre-swirled) combustor for application in general commercial aviation aircraft.

BACKGROUND OF THE INVENTION

Aircraft gas turbine engines include a combustor in which fuel is burned to input heat to the engine cycle. Typical combustors incorporate one or more fuel injectors whose function is to introduce liquid fuel into an air flow stream so that it can atomize and burn.

Staged combustors have been developed to operate with low pollution, high efficiency, low cost, high engine output, and good engine operability. In a staged combustor, the fuel nozzles of the combustor are operable to selectively inject fuel through two or more discrete stages, each stage being defined by individual fuel flowpaths within the fuel nozzle. For example, the fuel nozzle may include a pilot stage that operates continuously, and a main stage that only operates at higher engine power levels. An example of such a fuel nozzle is a Twin Annular Premixing Swirler (TAPS) fuel nozzle. The fuel flowrate may also be variable within each of the stages.

TAPS fuel nozzles require two injection/mixing stages within the injector for low emissions. The maximum pilot stage Tip Flow Number, and thus flow capacity, is limited by atomization performance at low flow conditions (e.g., starting and idling). As such, a need exists for high flow capacity in the pilot stage, particularly with respect to TAPS-style fuel nozzles.

BRIEF DESCRIPTION OF THE INVENTION

Aspects and advantages of the invention will be set forth in part in the following description, or may be obvious from the description, or may be learned through practice of the invention.

A fuel nozzle is generally provided for a gas turbine engine. In one embodiment, the fuel nozzle includes a pilot fuel injector having an axially-elongated, inner pilot centerbody wall and an outer pilot centerbody wall, with the axially-elongated, inner pilot centerbody wall extending from an upstream end to an annular fuel passage defining the downstream end of the pilot fuel injector. The fuel passage intersects with the inner pilot centerbody wall at a pilot fuel metering orifice. The fuel nozzle also includes a pilot fuel film surface downstream from the annular fuel passage and an annular splitter surrounding the pilot fuel injector. The annular splitter comprises, in axial sequence: a generally cylindrical upstream section, a splitter throat downstream of the pilot fuel film surface and having a diameter that is larger than a downstream diameter defined by the pilot fuel film surface, and a downstream diverging surface having an average diverging angle of about 24° to about 40° in relation to a centerline axis.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
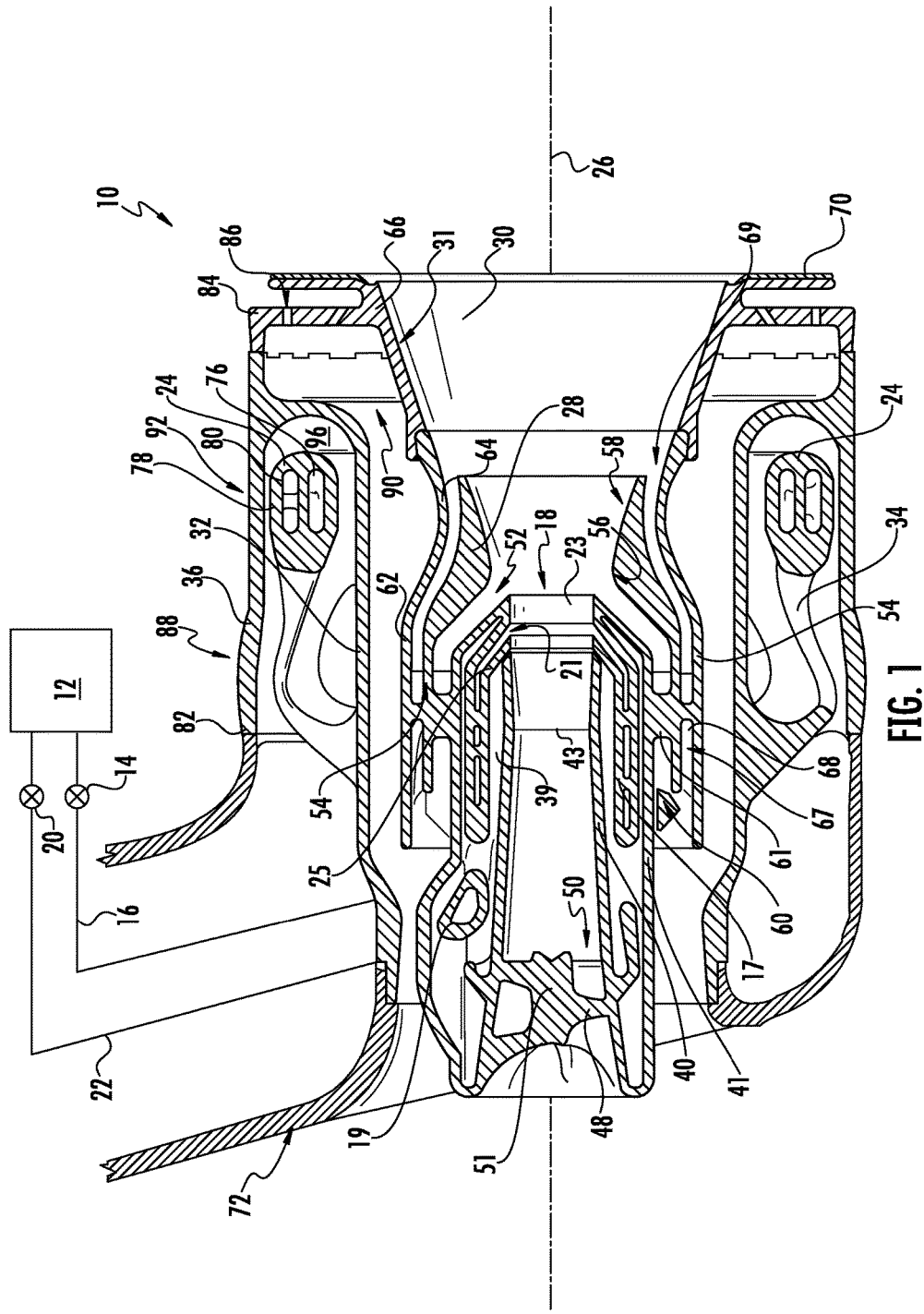
FIG. 1 is a schematic cross-sectional view of a gas turbine engine fuel nozzle constructed according to an aspect of the present invention.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

FIG. 1 shows an exemplary fuel nozzle 10 of a type configured to inject liquid hydrocarbon fuel into an airflow stream of a gas turbine engine combustor (not shown). The fuel nozzle 10 is of a "staged" type meaning it is operable to selectively inject fuel through two or more discrete stages, each stage being defined by individual fuel flowpaths within the fuel nozzle 10. The fuel flowrate may also be variable within each of the stages.

The fuel nozzle 10 is connected to a fuel system 12 of a known type, operable to supply a flow of liquid fuel at varying flowrates according to operational need. The fuel system supplies fuel to a pilot control valve 14 which is coupled to a pilot fuel conduit 16, which in turn supplies fuel to a pilot supply line 19 internal within the fuel nozzle 10. The fuel system 12 also supplies fuel to a main valve 20 which is coupled to a main fuel conduit 22, which in turn supplies a main injection ring 24 of the fuel nozzle 10.

For purposes of description, reference will be made to a centerline axis 26 of the fuel nozzle 10 which is generally parallel to a centerline axis of the engine (not shown) in which the fuel nozzle 10 would be used. The major components of the illustrated fuel nozzle 10 are disposed extending parallel to and surrounding the centerline axis 26, generally as a series of concentric rings. Starting from the centerline axis 26 and preceding radially outward, the major components are: the pilot fuel injector 18, a splitter 28, a venturi 30, an inner body 32, a main ring support 34, the main injection ring 24, and an outer body 36. Each of these structures will be described in detail.

The pilot fuel injector 18 is disposed at an upstream end of the fuel nozzle 10, aligned with the centerline axis 26. As shown, the pilot fuel injector 18 includes an axially-elongated, inner pilot centerbody wall 40 forming a hollow tube, and outer pilot centerbody wall 41. An annular fuel passage 25 defining the downstream end of the hollow tube of the pilot fuel injector 18, with the fuel passage 25 intersecting with the centerbody wall 40 at a pilot fuel metering orifice 21. A pilot fuel film surface 23 is downstream from the annular fuel passage 25 such that its upstream end is defined by the pilot fuel metering orifice 21. The pilot fuel film surface 23 terminates at its downstream end at the inner air circuit 52.

The centerbody wall 40 has a diverging-converging orientation downstream from the pilot fuel metering orifice 21 to define a throat 43 between the center swirler 51 and the pilot fuel metering orifice 21. In one embodiment, the throat 43 has a throat diameter is about 0.75 to about 1.25 times a throat-to-prefilmer distance measured along the centerline axis 26 from the throat 43 to the downstream end of the pilot fuel film surface 23. For example, the throat 43 can have a throat diameter of about 0.9 to about 1.1 times the throat-to-prefilmer distance.

The throat 43 has an inner diameter that is less than the diameter of any other area within the pilot fuel injector 18 defined by the centerbody wall 40. In one embodiment, the centerbody wall 40 defines an average diverging angle of about 3° to about 7° relative to the centerline axis 26 in the downstream portion between the throat 43 and the pilot fuel metering orifice 21, such as about 4° to about 6°. In one embodiment, the centerbody wall 40 defines an average converging angle of about 1° to about 15° relative to the centerline axis 26 in the upstream portion between the center swirler 51 and the throat 43, such as about 5° to about 10°.

The ratio of the length-to-diameter of the pilot fuel film surface 23 is, in particular embodiments, about 0.3 to about 0.75, measured by dividing the distance of the pilot fuel film surface 23 from the pilot fuel metering orifice 21 to the inner air circuit 52 by the smallest diameter defined by the pilot fuel film surface 23. In one embodiment, the pilot fuel film surface 23 has a constant diameter from the pilot fuel metering orifice 21 to the inner air circuit 52. The constant diameter of the pilot fuel film surface 23 is, in one particular embodiment, greater than the downstream diameter of the axially-elongated, inner pilot centerbody wall.

A center air circuit 50 is defined by the center swirler 51 having center swirl vanes 48 shaped and oriented to induce a swirl into air flowing through the center swirler 51 and into the pilot fuel injector 18. In one embodiment, the center swirl vanes 51 define a trailing edge having an angle with respect to the centerline axis 26 that is about 40° to about 50°.

A pilot fuel cartridge 17 is positioned between the inner pilot centerbody wall 40 and outer pilot centerbody wall 41 and provides a swirl path for the pilot supply line 19. As discussed below, the pilot fuel circuit is designed to be thermally coupled with the main fuel circuit by being channeled thru a passage positioned in the ring radially outside main circuit and closest to the main center-body. As the pilot fuel flows around the ring, the passage is designed to divide and rejoin the flow around every main injection post. As the pilot flow continues its journey beyond the main ring and to the pilot center-body, the pilot fuel enters the pilot fuel cartridge 17 and takes two helical loops around the center line before encountering the pilot fuel metering orifices 21, which are annular structures with helical flow and metering orifices.

The pilot fuel injector 18 defines a relatively small, stable pilot flame zone, which is fueled by the air-blast pilot fuel injector 18 and set up with air supplied by the center air circuit 50 and the inner air circuit 52. This pilot burn zone is centrally located within the annular combustor flow field in a radial sense and is supplied air by the center air circuit 50 and inner air circuit 52.

Figure 2:
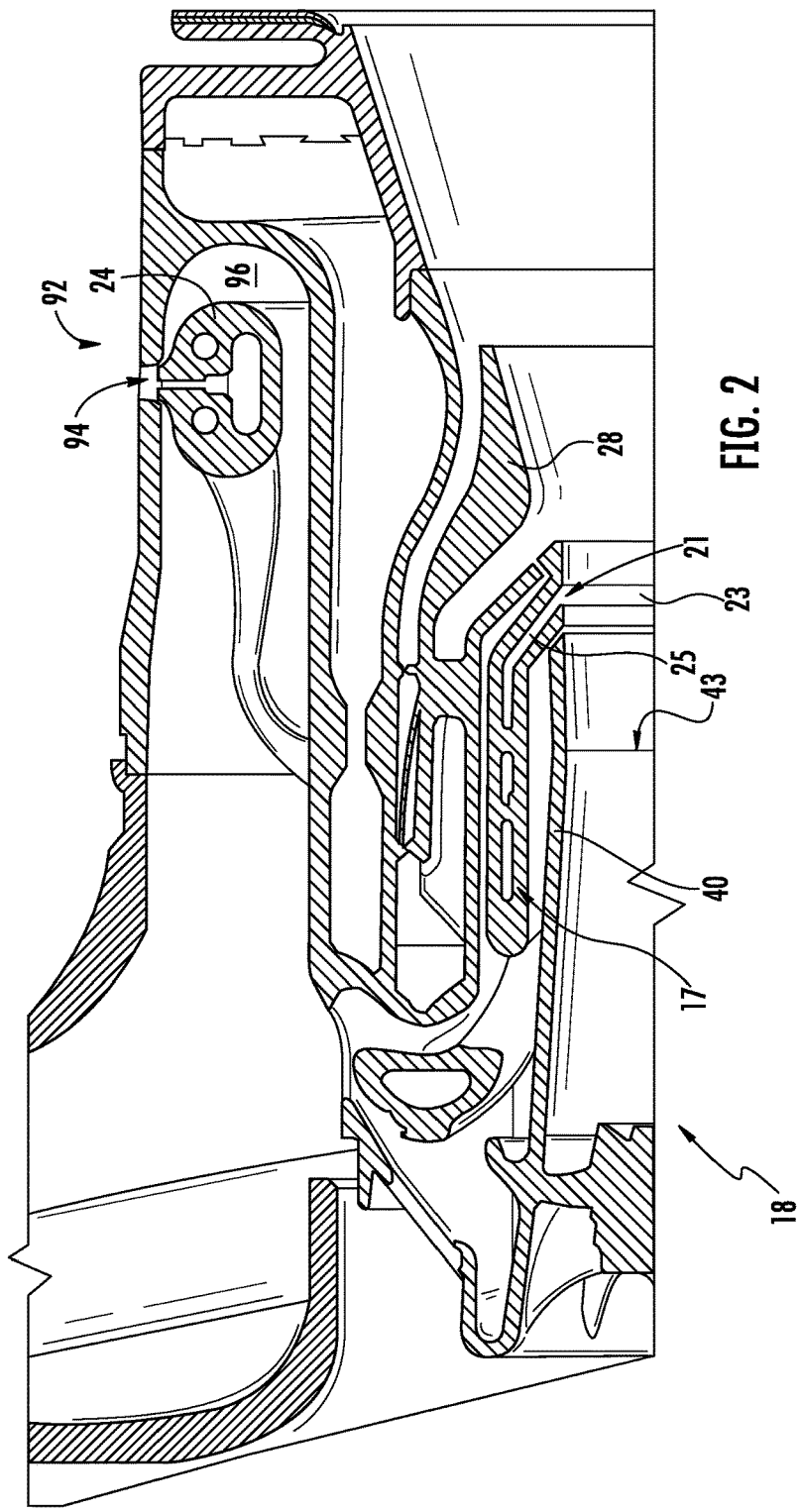
FIG. 2 is an exploded, schematic cross-sectional view of the gas turbine engine fuel nozzle of FIG. 1.
Figure 3:
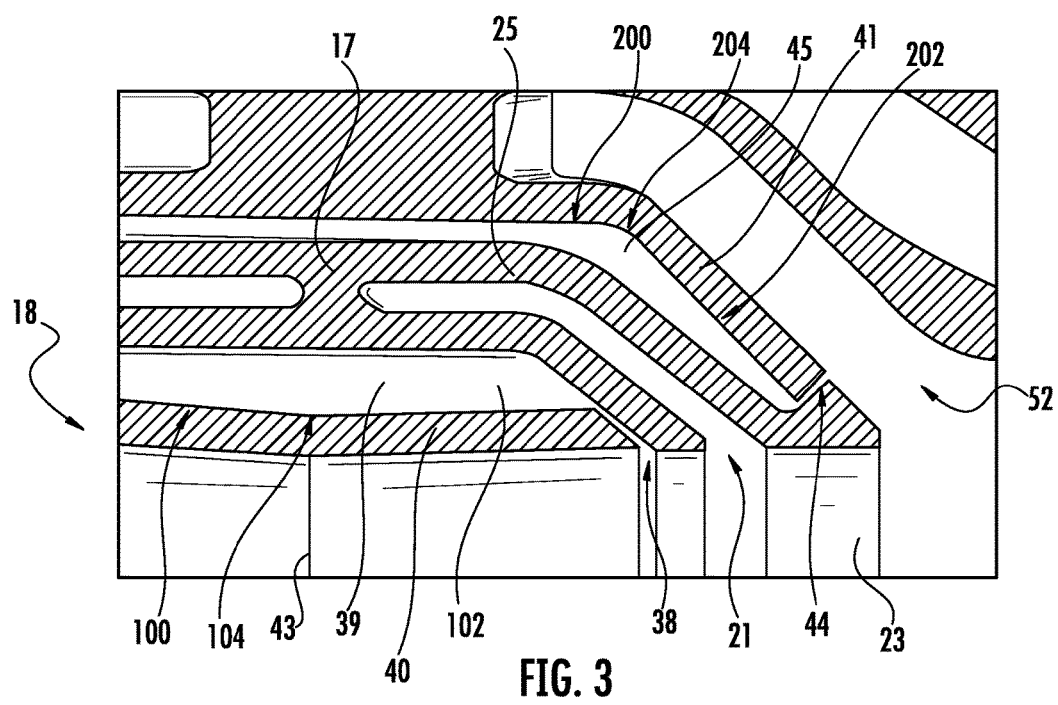
FIG. 3 is an exploded, schematic cross-sectional view of the pilot portion of the fuel engine fuel nozzle of FIG. 1.

As more particularly shown in FIGS. 2 and 3, the pilot fuel injector 18 defines an inner purge air inlet port 38 extending from an inner purge air cavity 39, which is defined between the inner pilot centerbody wall 40 and the pilot fuel cartridge 17. The pilot fuel injector 18 also defines an outer purge air inlet port 44 extending from an outer purge air cavity 45, which is defined between the pilot fuel cartridge 17 and the outer pilot centerbody wall 41. The inner and outer purge air inlet ports 38, 44 are sized and placed in series with controlled exit gap dimensions to manage intake of hot gas and internal convective heating by keeping internal velocities to a minimum while still providing a small positive flow thru the exit purge gaps at all times in order to maintain margin against back flow of fuel into the cavities 39, 45, respectively. Keeping purge flow to a minimum also keeps local convective heating at injection sites to a minimum.

The inner and outer purge air cavities 39, 45 are positioned on either side of the pilot fuel cartridge 17 so as to help to equalize pressure potentials within either and therefore minimize internal airflow from one to the other thru the center-body crossover tube. This equalization reduces convective heating of the pilot tubes passing between centerbodies within this passage and ensures minimal heating caused by air impingement on the surface of fuel bearing passages in the locality of the crossover.

As shown in FIG. 3, the inner purge air cavity 39 has an expanding region 100 where the distance between the inner pilot centerbody wall 40 and the pilot fuel cartridge 17 is increasing. Also, the inner purge air cavity 39 has a contracting region 102 where the distance between the inner pilot centerbody wall 40 and the pilot fuel cartridge 17 is decreasing. An expanded ring area 104 is defined between the expanding region 100 and the contracting region 102. The inner purge air inlet port 38 extends from the contracting region 102 at its smallest distance (i.e., opposite from the expanding ring area 104).

Similarly, the outer purge air cavity 45 has an expanding region 200 where the distance between the outer pilot centerbody wall 41 and the pilot fuel cartridge 17 is increasing. Also, the outer purge air cavity 45 has a contracting region 202 where the distance between the outer pilot centerbody wall 41 and the pilot fuel cartridge 17 is decreasing. An expanded ring area 204 is defined between the expanding region 200 and the contracting region 202. The outer air inlet port 45 extends from the contracting region 202 at its smallest distance (i.e., opposite from the expanding ring area 204).

Referring again to FIG. 1, the annular splitter 28 surrounds the pilot fuel injector 18. It includes, in axial sequence: a generally cylindrical upstream section 54, a splitter throat 56 of minimum diameter, and a downstream diverging surface 58. As shown, the splitter throat 56 is downstream of the pilot fuel film surface 23 and has a diameter that is larger than a downstream diameter defined by the pilot fuel film surface 23. The downstream diverging section 58 has an average diverging angle of about 24° to about 40° in relation to a centerline axis 26. In one embodiment, the downstream diverging section 58 has a substantially constant diverging angle (e.g., at a diverging angle of about 24° to about 40° in relation to a centerline axis 26).

Within the inner air circuit 52, an inner air swirler 60 comprises a radial array of inner swirl vanes 61 which extend between the pilot centerbody 40 and the upstream section 54 of the splitter 28. The inner swirl vanes 61 are shaped and oriented to induce a swirl into air flow passing through the inner air swirler 60. In one embodiment, the inner swirl vanes 61 define a trailing edge with an angle of about 10° to about 35° relative to the centerline axis. In one particular embodiment, the inner air circuit 52 defined from the inner air swirler 60 to its intersection with the film pilot fuel film surface 23 has a substantially constant passage annular spacing between the outer pilot centerbody wall 41 and the upstream section 54 of the annular splitter 28. Without wishing to be bound by any particular theory, it is believed that this substantially constant spacing allows the higher velocity air to stay on the inner surface so as to provide good atomization of fuel exiting the fuel filming surface 23.

The annular venturi 30 surrounds the splitter 28. It includes, in axial sequence: a generally cylindrical upstream section 62, a throat 64 of minimum diameter, and a downstream diverging section 66. In one embodiment, the downstream diverging section 66 has an average diverging angle of about 28° to about 44° in relation to the centerline axis. The downstream diverging section 66, in one particular embodiment, can have a substantially constant diverging angle that is about 28° to about 44° in relation to the centerline axis.

The outer air circuit 69 includes a radial array of outer swirl vanes 68 defining an outer air swirler 67 extends between the splitter 28 and the venturi 30. The outer swirl vanes 68, splitter 28, and inner swirl vanes 60 physically support the pilot fuel injector 18. The outer swirl vanes 68 are shaped and oriented to induce a swirl into air flow passing through the outer air swirler 67. In one embodiment, the outer swirl vanes define a trailing edge with an angle of about 40° to about 60° relative to the centerline axis, such as about 40° to about 55°.

The bore of the venturi 30 defines a flowpath for a pilot air flow, through the fuel nozzle 10. A heat shield 70 in the form of an annular, radially-extending plate may be disposed at an aft end of the diverging section 66. A thermal barrier coating (TBC) (not shown) of a known type may be applied on the surface of the heat shield 70 and/or the diverging section 66.

To keep fuel off the venturi wall 31 and help maintain pilot stability, while the two burn zones operate somewhat independently, a buffer zone of air is added along the venturi wall 31 through the outer air circuit 69 formed form the outer swirl vanes 68. The outer air circuit 69 is an annular passage that lies radially inward of the venturi wall 31 and directly adjacent to the splitter 28, which separates the inner air circuit 52 and outer air circuit 69 and permits completely independent design parameters for either circuit (i.e. vane turning angles, exit focus, momentum split and effective area). In one embodiment, the outer air circuit 69 is defined from the outer air swirler 67 to a downstream end of the annular splitter 28 with a substantially constant passage spacing between the annular venturi 30 and the annular splitter 28.

The annular inner body 32 surrounds the venturi 30 and serves as a radiant heat shield as well as other functions described below. The annular main ring support 34 surrounds the inner body 32. The main ring support 34 serves as a mechanical connection between the main injection ring 24 and stationary mounting structure, such as a fuel nozzle stem 72.

The main injection ring 24 is annular in form, and surrounds the venturi 30. It may be connected to the main ring support 34 by one or more main support arms (not shown). The main injection ring 24 includes a main fuel gallery 76 extending in a circumferential direction, which is coupled to and supplied with fuel by the main fuel conduit 22. A radial array of main fuel orifices 78 formed in the main injection ring 24 communicate with the main fuel gallery 76. During engine operation, fuel is discharged through the main fuel orifices 78. Running through the main injection ring 24 closely adjacent to the main fuel gallery 76 are one or more pilot fuel galleries 80. During engine operation, fuel constantly circulates through the pilot fuel galleries 80 to cool the main injection ring 24 and prevent coking of the main fuel gallery 76 and the main fuel orifices 78.

The annular outer body 36 surrounds the main injection ring 24, venturi 30, and pilot fuel injector 18, and defines the outer extent of the fuel nozzle 10. A forward end 82 of the outer body 36 is joined to the stem 72. An aft end of the outer body 36 may include an annular, radially-extending baffle 84 incorporating cooling holes 86 directed at the heat shield 70. Extending between the forward and aft ends is a generally cylindrical exterior surface 88 which in operation is exposed to a mixer airflow. The outer body 36 defines a secondary flowpath 90, in cooperation with the venturi 30 and the inner body 32. Air passing through this secondary flowpath 90 is discharged through the cooling holes 86.

The outer body 36 includes an annular array of recesses, referred to as spray wells 92. Each of the spray wells 92 is defined by an opening 94 in the outer body 36 in cooperation with the main injection ring 24. Each of the main fuel orifices 78 is aligned with one of the spray wells 92.

The outer body 36 and the inner body 32 cooperate to define an annular tertiary space or void 96 protected from the surrounding, external air flow. The main injection ring 24 is contained in this void. Within the fuel nozzle 10, a flowpath is provided for the tip air stream to communicate with and supply the void 96 a minimal flow needed to maintain a small pressure margin above the external pressure at locations near the spray wells 92. In the illustrated example, this flow is provided by small supply slots (not shown) and supply holes (not shown) disposed in the venturi 30 and the inner body 32, respectively.

The fuel nozzle 10 and its constituent components may be constructed from one or more metallic alloys. Nonlimiting examples of suitable alloys include nickel and cobalt-based alloys. All or part of the fuel nozzle 10 or portions thereof may be part of a single unitary, one-piece, or monolithic component, and may be manufactured using a manufacturing process which involves layer-by-layer construction or additive fabrication (as opposed to material removal as with conventional machining processes). Such processes may be referred to as "rapid manufacturing processes" and/or "additive manufacturing processes," with the term "additive manufacturing process" being term herein to refer generally to such processes. Additive manufacturing processes include, but are not limited to: Direct Metal Laser Melting (DMLM), Laser Net Shape Manufacturing (LNSM), electron beam sintering, Selective Laser Sintering (SLS), 3D printing, such as by inkjets and laserjets, Sterolithography (SLS), Electron Beam Melting (EBM), Laser Engineered Net Shaping (LENS), and Direct Metal Deposition (DMD).

The foregoing has described a main injection structure for a gas turbine engine fuel nozzle. All of the features disclosed in this specification (including any accompanying claims, abstract and drawings), and/or all of the steps of any method or process so disclosed, may be combined in any combination, except combinations where at least some of such features and/or steps are mutually exclusive.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A fuel nozzle of a gas turbine engine, comprising:
   a pilot fuel injector comprising an axially-elongated, inner pilot centerbody wall and an outer pilot centerbody wall, wherein the axially-elongated, inner pilot centerbody wall extends from an upstream end to an annular fuel passage defining a first downstream end of the pilot fuel injector, the annular fuel passage intersecting with the axially-elongated, inner pilot centerbody wall at a pilot fuel metering orifice;
   a pilot fuel film surface downstream from the annular fuel passage and in fluid communication with a pilot fuel cartridge, wherein the pilot fuel cartridge is positioned between the axially-elongated, inner pilot centerbody wall and the outer pilot centerbody wall to provide a swirl path for a pilot supply line to the pilot fuel film surface, and wherein an inner purge air cavity is defined between the axially-elongated, inner pilot centerbody wall and the pilot fuel cartridge and extends to an inner purge air inlet port that is upstream from the pilot fuel film surface;
   an annular splitter surrounding the pilot fuel injector, wherein the annular splitter comprises, in axial sequence:
      an upstream section,
      a splitter throat downstream of the pilot fuel film surface and having a diameter that is larger than a downstream diameter defined by the pilot fuel film surface, and
      a downstream diverging surface having a first average diverging angle of between 30° and 40° in relation to a centerline axis, and
   an inner swirler comprising a first radial array of inner swirl vanes extending between the outer pilot centerbody wall and the upstream section of the annular splitter,
   wherein the inner swirl vanes define a first trailing edge with a first angle between 10° and 35° relative to the centerline axis.

2. The fuel nozzle as in claim 1, wherein an inner air circuit is defined from the inner swirler to an intersection with the pilot fuel film surface with a first constant passage spacing between the outer pilot centerbody wall and the upstream section of the annular splitter.

3. The fuel nozzle as in claim 2, further comprising:
   an annular venturi surrounding the pilot fuel injector and the annular splitter, the annular venturi having an exit positioned axially downstream of the pilot fuel injector and the annular splitter.

4. The fuel nozzle as in claim 3, wherein the annular venturi comprises, in axial sequence, a cylindrical upstream section, a venturi throat of minimum diameter, and a downstream diverging section.

5. The fuel nozzle as in claim 4, wherein the downstream diverging section of the annular venturi has a second average diverging angle between 28° and 44° in relation to the centerline axis.

6. The fuel nozzle as in claim 4, further comprising:
   an outer air swirler comprising a second radial array of outer swirl vanes extending between the annular splitter and the annular venturi.

7. The fuel nozzle as in claim 6, wherein the outer swirl vanes, the annular splitter, and the inner swirl vanes physically support the pilot fuel injector.

8. The fuel nozzle as in claim 6, wherein the outer swirl vanes define a second trailing edge with a second angle between 40° and 60° relative to the centerline axis.

9. The fuel nozzle as in claim 6, wherein the outer swirl vanes define a second trailing edge with a second angle between 40° and 55° relative to the centerline axis.

10. The fuel nozzle as in claim 6, wherein an outer air circuit is defined from the outer air swirler to a second downstream end of the annular splitter with a second constant passage spacing between the annular venturi and the annular splitter.

11. The fuel nozzle as in claim 8, wherein the axially-elongated, inner pilot centerbody wall has a diverging-converging orientation with respect to the centerline axis to define a hollow tube having an upstream diameter, a throat, and a downstream diameter, and wherein the throat has an inner diameter that is less than both of the upstream diameter and the downstream diameter.

12. The fuel nozzle as in claim 11, wherein the pilot fuel injector further comprises a center air circuit positioned at the upstream end of the axially-elongated, inner pilot centerbody wall, wherein the center air circuit is defined by a center swirler having center swirl vanes.

13. The fuel nozzle as in claim 12, wherein the center swirl vanes define a third trailing edge having a third angle with respect to the centerline axis that is between 40° and 50°.

14. The fuel nozzle as in claim 11, wherein the pilot fuel film surface has a constant diameter.

15. The fuel nozzle as in claim 3, further comprising:
   a main ring support;
   a main fuel conduit; and
   an annular main injection ring surrounding the annular venturi and connected to the main ring support, the annular main injection ring comprising a main fuel gallery extending in a circumferential direction,
   wherein the main fuel gallery is fluidly coupled to, and supplied with fuel by, the main fuel conduit.

16. The fuel nozzle as in claim 15, the annular main injection ring further comprising:
   at least one pilot fuel gallery, the at least one pilot fuel gallery adjacent to, and radially spaced from, the main fuel gallery,
   wherein the at least one pilot fuel gallery surrounds the main fuel gallery,
   wherein a first cross-section of the main fuel gallery is axially-elongated, and
   wherein a second cross-section of the at least one pilot fuel gallery is axially-elongated.

17. The fuel nozzle as in claim 15, further comprising:
   an outer body, the outer body radially outward from and surrounding the annular main injection ring; and
   an inner body, the inner body radially inward from and surrounded by the annular main injection ring;

wherein the outer body and the inner body define a void therebetween with the annular main injection ring contained within the void.

18. The fuel nozzle as in claim 17, the outer body further comprising:
an array of recesses defining at least one spray well, the at least one spray well comprising an opening in the outer body, the opening in fluid communication with the annular main injection ring.

19. A fuel nozzle of a gas turbine engine, comprising:
a pilot fuel injector comprising an axially-elongated, inner pilot centerbody wall and an outer pilot centerbody wall, wherein the axially-elongated, inner pilot centerbody wall extends from an upstream end to an annular fuel passage defining a downstream end of the pilot fuel injector, the annular fuel passage intersecting with the axially-elongated, inner pilot centerbody wall at a pilot fuel metering orifice;
a pilot fuel film surface downstream from the annular fuel passage and in fluid communication with a pilot fuel cartridge, wherein the pilot fuel cartridge is positioned between the axially-elongated inner pilot centerbody wall and the outer pilot centerbody wall to provide a swirl path for a pilot supply line to the pilot fuel film surface, and wherein an inner purge air cavity is defined between the axially-elongated inner pilot centerbody wall and the pilot fuel cartridge and extends to an inner purge air inlet port that is upstream from the pilot fuel film surface, and further wherein an outer purge air cavity is defined between the pilot fuel cartridge and the outer pilot centerbody wall and extends to an outer purge air inlet port;
an annular splitter surrounding the pilot fuel injector, wherein the annular splitter comprises, in axial sequence:
an upstream section; and
a splitter throat downstream of the pilot fuel film surface and having a diameter that is larger than a downstream diameter defined by the pilot fuel film surface;
an inner swirler comprising a first radial array of inner swirl vanes extending between the outer pilot centerbody wall and the upstream section of the annular splitter, wherein the inner swirl vanes define a first trailing edge with a first angle of 10° to 35° relative to a centerline axis;
an annular venturi surrounding the pilot fuel injector and the annular splitter, the annular venturi having an exit positioned axially downstream of the pilot fuel injector and the annular splitter;
an outer air swirler comprising a second radial array of outer swirl vanes extending between the annular splitter and the annular venturi, wherein the outer swirl vanes define a second trailing edge with a second angle of 40° to 60° relative to the centerline axis; and
a center air circuit defined by a center swirler having center swirl vanes, at least a portion of the center air circuit being positioned between the inner swirler and the outer swirler, wherein the center swirl vanes define a third trailing edge having a third angle with respect to the centerline axis that is 40° to 50°.

20. The fuel nozzle as in claim 19, wherein the annular splitter comprises, in axial sequence: the upstream section, the splitter throat downstream of the pilot fuel film surface, and a downstream diverging surface having an average diverging angle between 30° and 40° in relation to the centerline axis.

* * * * *